United States Patent
Cha et al.

(10) Patent No.: US 11,210,533 B1
(45) Date of Patent: Dec. 28, 2021

(54) METHOD OF PREDICTING TRAJECTORY OF VEHICLE

(71) Applicant: Phantom AI, Inc., Burlingame, CA (US)

(72) Inventors: Yeonhwa Cha, San Mateo, CA (US); Myung Hwangbo, Palo Alto, CA (US); Youngwook Kwon, Burlingame, CA (US)

(73) Assignee: PHANTOM AI, INC., Burlingame, CA (US)

( * ) Notice: Subject to any disclaimer, the term of this patent is extended or adjusted under 35 U.S.C. 154(b) by 0 days.

(21) Appl. No.: 16/988,703

(22) Filed: Aug. 9, 2020

(51) Int. Cl.
    *G06K 9/00*     (2006.01)
    *G06T 7/246*     (2017.01)
    *G06K 9/46*     (2006.01)

(52) U.S. Cl.
    CPC ....... *G06K 9/00798* (2013.01); *G06K 9/4604* (2013.01); *G06T 7/248* (2017.01); *G06T 2207/20084* (2013.01); *G06T 2207/30241* (2013.01); *G06T 2207/30252* (2013.01)

(58) Field of Classification Search
    CPC ........... G06T 7/248; G06T 2207/20084; G06T 2207/30252; G06T 2207/30241
    See application file for complete search history.

(56) References Cited

U.S. PATENT DOCUMENTS

| | | | |
|---|---|---|---|
| 9,466,000 | B2 | 10/2016 | Bhanu et al. |
| 10,077,047 | B2 | 9/2018 | Gutmann |
| 10,127,465 | B2 | 11/2018 | Cohen et al. |
| 10,304,191 | B1 | 5/2019 | Mousavian et al. |
| 10,599,930 | B2 | 3/2020 | Lee et al. |
| 2013/0294643 | A1* | 11/2013 | Fan ............................ G01P 3/38 382/103 |
| 2015/0035973 | A1 | 2/2015 | Rammos |
| 2016/0297432 | A1 | 10/2016 | Fletcher et al. |
| 2017/0371344 | A1 | 12/2017 | Cohen et al. |
| 2018/0239973 | A1 | 8/2018 | Bovyrin et al. |
| 2018/0249058 | A1* | 8/2018 | Imagawa .................. G06T 7/70 |
| 2019/0025853 | A1 | 1/2019 | Julian et al. |
| 2019/0072977 | A1 | 3/2019 | Jeon |

(Continued)

OTHER PUBLICATIONS

Siyang Li, Box Refinement: Object Proposal Enhancement and Pruning, 2017 IEEE Winter Conference on Applications of Computer Vision (WACV), Mar. 2017.

(Continued)

*Primary Examiner* — Carol Wang

(57) ABSTRACT

A method of predicting a trajectory of a target vehicle with respect to an ego vehicle includes receiving a first image having a target object representing a target vehicle on a road from a camera mounted on the ego vehicle, generating a bounding box associated with the target vehicle, the bounding box surrounding a contour of the target object, extracting tire contact information of the target object with a road surface from the first image, wherein each tire contact information represents coordinates, in the first image, of contact between a corresponding tire and the road, mapping the plurality of tire contact information from the first image to a bird's eye view image of the first image, and calculating the trajectory, with reference to a moving direction of the ego vehicle, of the target object using the mapped tire contact information on the bird's eye view image.

20 Claims, 15 Drawing Sheets

(56) References Cited

U.S. PATENT DOCUMENTS

| | | |
|---|---|---|
| 2019/0096086 A1 | 3/2019 | Xu et al. |
| 2019/0147600 A1 | 5/2019 | Karasev et al. |
| 2019/0176818 A1* | 6/2019 | Movert .................... G06N 3/04 |
| 2019/0317519 A1 | 10/2019 | Chen |
| 2019/0333389 A1 | 10/2019 | Wang |
| 2020/0184233 A1* | 6/2020 | Berberian .......... G06K 9/00798 |

OTHER PUBLICATIONS

Sofia Grigorescu, A Survey of Deep Learning Techniques for Autonomous Driving, Journal of Field Robotics, Mar. 24, 2020.

Ruyi Jiang, New Lane Model and Distance Transform for Lane Detection and Tracking, Proceedings of the 13th International Conference on Computer Analysis of Images and Patterns, Sep. 2009.

European Patent Office, Patents and Self-Driving Vehicles, Nov. 2018.

Chien-Chuan Lin, A Vision Based Top-View Transformation Model for a Vehicle Parking Assistant, Sensors 2012, Mar. 16, 2012, p. 4431-4446, vol. 12.

Jimei Yang, Object Contour Detection With a Fully Convolutional Encoder-Decoder Network, CVPR 2016, Mar. 15, 2016.

Joel O. Goya, Vision-Based Obstacle Avoidance Using Deep Learning, XIII Latin American Robotics Symposium and IV Brazilian Robotics Symposium (LARS/SBR), Oct. 2016.

Oliver Stromgren, Deep Learning for Autonomous Collision Avoidance, Linkoping University, 2018, Linkoping, Sweden.

Yihui He, Bounding Box Regression With Uncertainty for Accurate Object Detection, Computer Vision Foundation, 2019.

Takeaki Takiguchi, Collision Avoidance Algorithm Using Deep Learning Type Artificial Intelligence for a Mobile Robot, Proceedings of the International MultiConference of Engineers and Computer Scientists 2018, Mar. 2018, vol. I, Hong Kong.

Mahdi Rezaei, Robust Vehicle Detection and Distance Estimation Under Challenging Lighting Conditions, IEEE Transactions on Intelligent Transportation Systems, Jan. 2015.

Cesar Barrios, Predicting Trajectory Paths for Collision Avoidance Systems, University of Vermont, Jan. 2015.

Spyros Gidaris, Object Detection Via a Multi-Region & Semantic Segmentation-Aware CNN Model, ICCV 2015, Sep. 23, 2015.

Marius Cordts, The Cityscapes Dataset for Semantic Urban Scene Understanding, Apr. 7, 2016.

Zhiding Yu, Casenet: Deep Category-Aware Semantic Edge Detection, CVPR 2017, May 27, 2017.

* cited by examiner

S150

S200

METHOD OF PREDICTING TRAJECTORY OF VEHICLE

TECHNICAL FIELD

The present inventive concept relates to a method of predicting a trajectory of a vehicle on a road, more particularly, a method of predicting a trajectory of a vehicle on a road using tire contact information thereof.

DISCUSSION OF RELATED ART

Safe driving of an ego vehicle, either using an autonomous driving technology or a driving assistance technology, may depend on predicting a trajectory of a neighboring vehicle on a road. Reliable trajectory prediction of the neighboring vehicle may benefit from various sensors equipped with the ego vehicle. For example, the various sensors may include lasers, sonar, radar, cameras, and other devices which observe the ego vehicle's surroundings. With at least one of those sensors, the ego vehicle may identify a neighboring vehicle, predict a trajectory thereof and control itself to avoid collision to the neighboring vehicle. Accordingly, safe driving of the ego vehicle may demand reliable and fast prediction of a trajectory of the neighboring vehicle.

SUMMARY

According to an exemplary embodiment of the present invention, a method of predicting a trajectory of a target vehicle with respect to an ego vehicle includes receiving a first image having a target object representing a target vehicle on a road from a camera mounted on the ego vehicle, generating a bounding box associated with the target vehicle, the bounding box surrounding a contour of the target object, extracting a plurality of tire contact information of the target object with a road surface from the first image, wherein each of the plurality of tire contact information represents coordinates, in the first image, of contact between a corresponding tire and the road, mapping the plurality of tire contact information from the first image to a bird's eye view image of the first image, and calculating the trajectory, with reference to a moving direction of the ego vehicle, of the target object using the plurality of mapped tire contact information on the bird's eye view image.

According to an exemplary embodiment of the present invention, a method of predicting a trajectory of a target vehicle with respect to an ego vehicle includes receiving a first image having a plurality of target objects representing a plurality of target vehicles on a road from a camera mounted on the ego vehicle, detecting the plurality of target objects from the first image using a first convolutional neural network, generating a plurality of preliminary bounding boxes associated with the plurality of target objects, cropping the plurality of preliminary bounding boxes to generate a plurality of input images, resizing each of the plurality of input images to a predefined size, detecting a plurality of contours of the plurality of target objects from the plurality of resized input images, extracting a plurality of tire contact information of a first target object of the plurality of target objects from a corresponding resized input image of the plurality of resized input images, each of the plurality of tire contact information representing coordinates, in the first image, of contact between a corresponding tire of the first target object and the road, generating a plurality of bounding boxes based on the plurality of contours of the plurality of target objects, mapping a plurality of tire contact information of the first target object from the first image to a bird's eye view image, and calculating a trajectory of the first target object, with reference to a moving direction of the ego vehicle, using the plurality of mapped tire contact information on the bird's eye view image.

According to an exemplary embodiment of the present invention, a method of controlling an ego vehicle includes receiving a first image having a plurality of target objects representing a plurality of target vehicles on a road from a camera mounted on the ego vehicle, generating a plurality of preliminary bounding boxes surrounding the plurality of target objects using a first convolutional neural network, generating, from the first image, a plurality of input images by resizing a plurality of image portions defined by the plurality of preliminary bounding boxes, the plurality of input images having the same size, generating, from each of the plurality of input images, a contour of a corresponding target object and at least two tire contact information associated with at least two tires of the corresponding target object using a second convolutional neural network, the at least two tire contact information being associated with at least two contour portions of the contour corresponding to at least two tires of the corresponding target object, and each of the at least two tire contact information representing coordinates, in the first image, of contact between a corresponding tire and the road, mapping the at least two tire contact information from the first image to a bird's eye view image of the first image, and calculating a moving direction, with reference to a first moving direction of the ego vehicle, of the corresponding target object using the mapped at least two tire contact information on the bird's eye view image, and adjusting, in response to the calculating of the moving direction of the corresponding target object, the first moving direction of the ego vehicle to a second moving direction thereof.

BRIEF DESCRIPTION OF DRAWINGS

These and other features of the present invention will become more apparent by describing in detail exemplary embodiments thereof with reference to the accompanying drawings of which.

Figure 1:
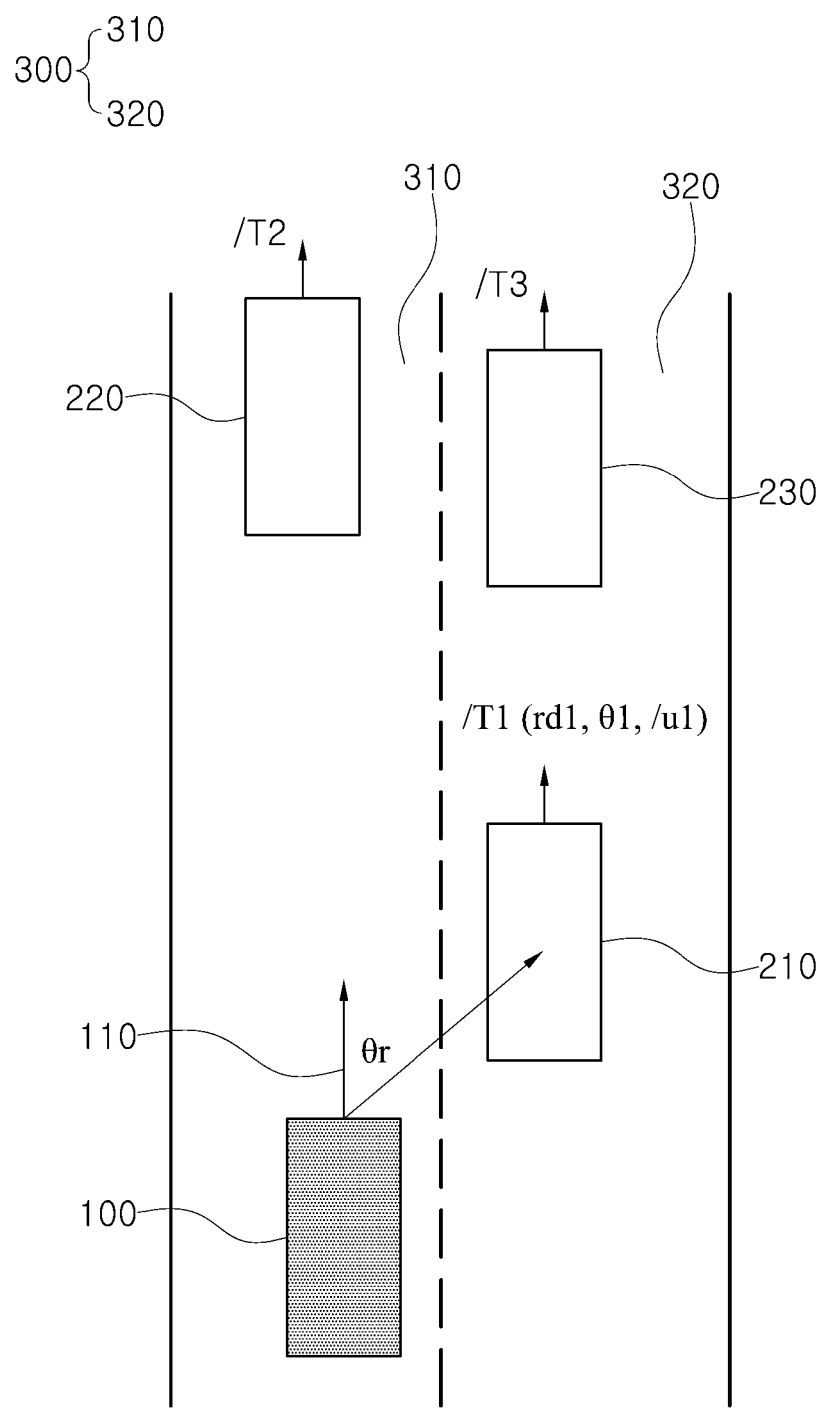
FIG. 1 shows a road environment of an ego vehicle according to an exemplary embodiment of the present invention.

It will be appreciated that for simplicity and clarity of illustration, elements illustrated in the drawings have not necessarily been drawn to scale. For example, the dimensions of some of the elements are exaggerated relative to other elements for clarity. Further, where considered appropriate, reference numerals have been repeated among the drawings to indicate corresponding or analogous elements.

DETAILED DESCRIPTION OF EXEMPLARY EMBODIMENTS

Exemplary embodiments of the present invention will be described below in detail with reference to the accompanying drawings. The following detailed description is provided to assist the reader in gaining comprehensive understanding of the methods, apparatuses, and/or systems described herein. However, various changes, modifications, and equivalents of the methods, apparatuses, and/or systems described herein will be apparent after understanding of the disclosure of this application. The sequences of operations described herein are merely examples, and are not limited to those set forth herein, but may be changed as will be apparent after understanding of the disclosure of this application, with the exception of operations necessarily occurring in a certain order. Descriptions of functions and constructions that are well known to one of ordinary skill in the art may be omitted for simplicity of description.

The features described herein may be embodied in different forms and/or steps, and are not to be construed as being limited to the examples described herein. Rather, the examples described herein have been provided merely to illustrate some of the many possible ways of implementing the methods, apparatuses, and/or systems described herein that will be apparent after understanding of the disclosure of this application.

Terms such as first, second, A, B, (a), (b), and the like may be used herein to describe components (or steps). Each of these terminologies is not used to define sequence of a corresponding component (or step) but used merely to distinguish the corresponding component (or step) from other components. For example, a first component (or step) may be referred to a second component (step), and similarly the second component (step) may also be referred to as the first component (or step).

FIG. 1 shows a road environment of an ego vehicle according to an exemplary embodiment of the present invention. In the road environment, an ego vehicle 100 is traveling along a roadway 300 with a plurality of neighboring vehicles 210 to 230. Hereinafter, the ego vehicle 100 may refer to an autonomous vehicle or a semi-autonomous vehicle with a road environment awareness system which operates according to an exemplary embodiment of the present invention. The road environment awareness system may be part of autonomous driving and/or driver assist technology to predict a trajectory of at least one of the plurality of neighboring vehicles 210 to 230. For the simplicity of description, the road environment includes three neighboring vehicles 210 to 230. The present invention is not limited thereto. In an exemplary embodiment, the road environment may include one or two neighboring vehicles, or more than three neighboring vehicles.

The ego vehicle 100 includes a road environment awareness system for periodically determining a trajectory of at least one of the plurality of neighboring vehicles 210 to 230. For example, the road environment awareness system of the ego vehicle 100 predicts a first trajectory /T1 of a first neighboring vehicle 210. The term "/T1" represents a vector of a trajectory along which the first neighboring vehicle 210 is predicted to follow. The first trajectory /T1 includes an angular position including a relative distance rd1 of the first neighboring vehicle 210 from the ego vehicle 100 and an angle θ1 with respect to a moving direction 110 of the ego vehicle 100, and a moving direction /u1 of the first neighboring vehicle 210. The term "/u1" represents a unit velocity of the first neighboring vehicle 210, which corresponds to a moving direction of the first neighboring vehicle 210.

The relative distance rd1 may be a distance between the ego vehicle 100 (e.g., a camera of the ego vehicle 100) and a predetermined point of the first neighboring vehicle 210. In an exemplary embodiment, the predetermined point of the first neighboring vehicle 210 may include at least one tire contact information thereof, which will be described later. The angle θ1 may be an angle between the moving direction 110 of the ego vehicle 100 and a direction along which the relative distance rd1 is measured. The angle θ1 may be positive when measured in a clockwise direction with respect to the moving direction 110, and may be negative when measured in a counterclockwise direction with respect to the moving direction 110. The present invention is not limited thereto. In an exemplary embodiment, the sign notation may change to the opposite.

With the first trajectory /T1 of the first neighboring vehicle 210, the ego vehicle 100 may control the steering, acceleration and/or deceleration of the ego vehicle 100 to safely follow a route or to avoid collision to the first neighboring vehicle 210. The present invention is not limited thereto. In an exemplary embodiment, the ego vehicle 100 may also predict a second trajectory /T2 of a second neighboring vehicle 220 and a third trajectory /T3 of a third neighboring vehicle 230 to safely follow a route or to avoid collision to the first to third neighboring vehicles 210 to 230.

The road environment includes a roadway 300 with two northbound lanes 310 and 320. In the road environment, it is assumed that the ego vehicle 100 is traveling in the northbound lane 310 and is approaching the plurality of neighboring vehicles 210 to 230. The present invention is not limited thereto. In an exemplary embodiment, the roadway 300 may be a single lane or may include more than two lanes. When travelling along the northbound lane 310 in the road environment, the ego vehicle 100 may detect the plurality of neighboring vehicles 210 to 230 as shown in FIG. 2.

Figure 2:
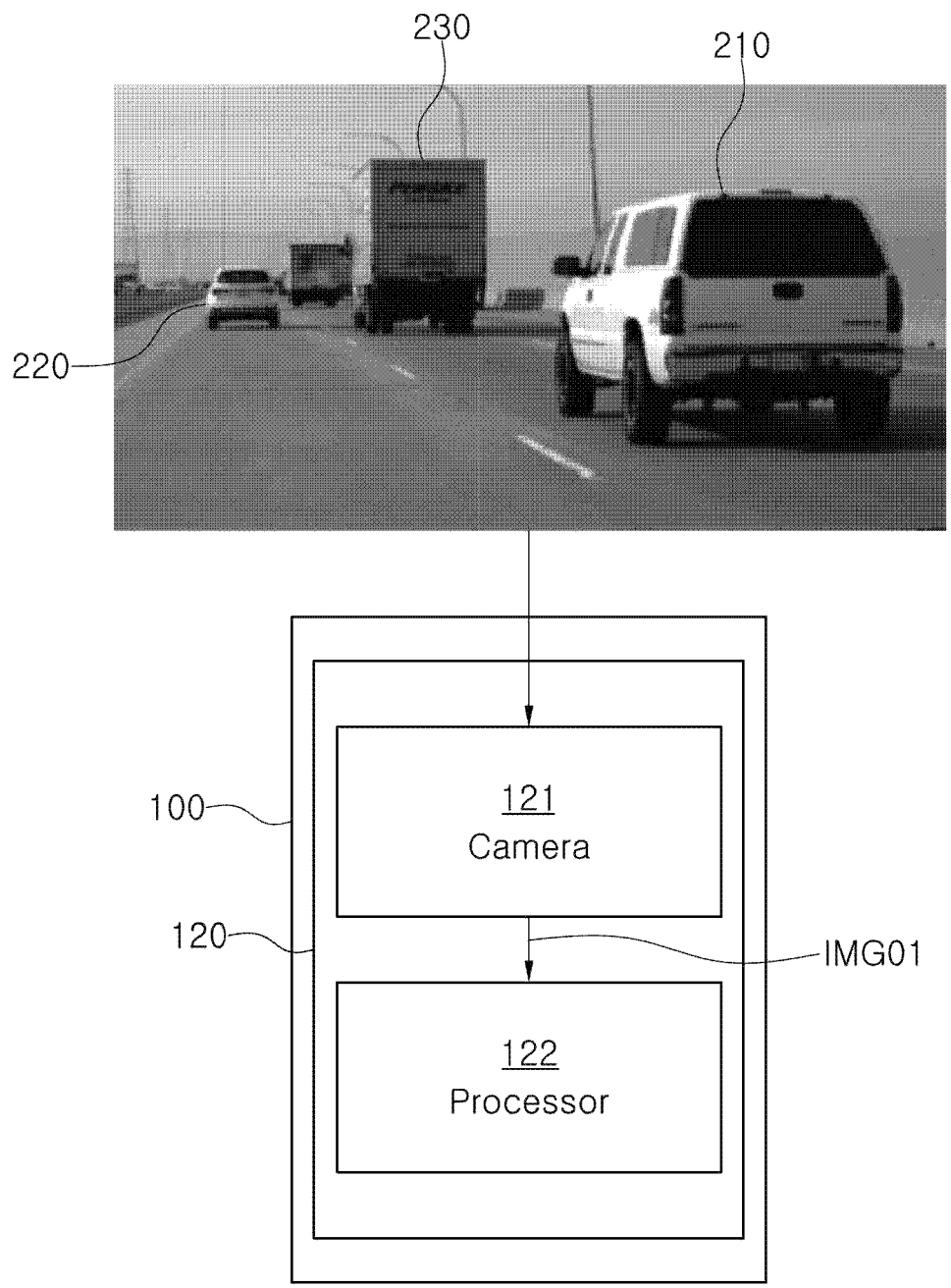
FIG. 2 shows a road environment awareness system of an ego vehicle according to an exemplary embodiment of the present invention.
Figure 3:
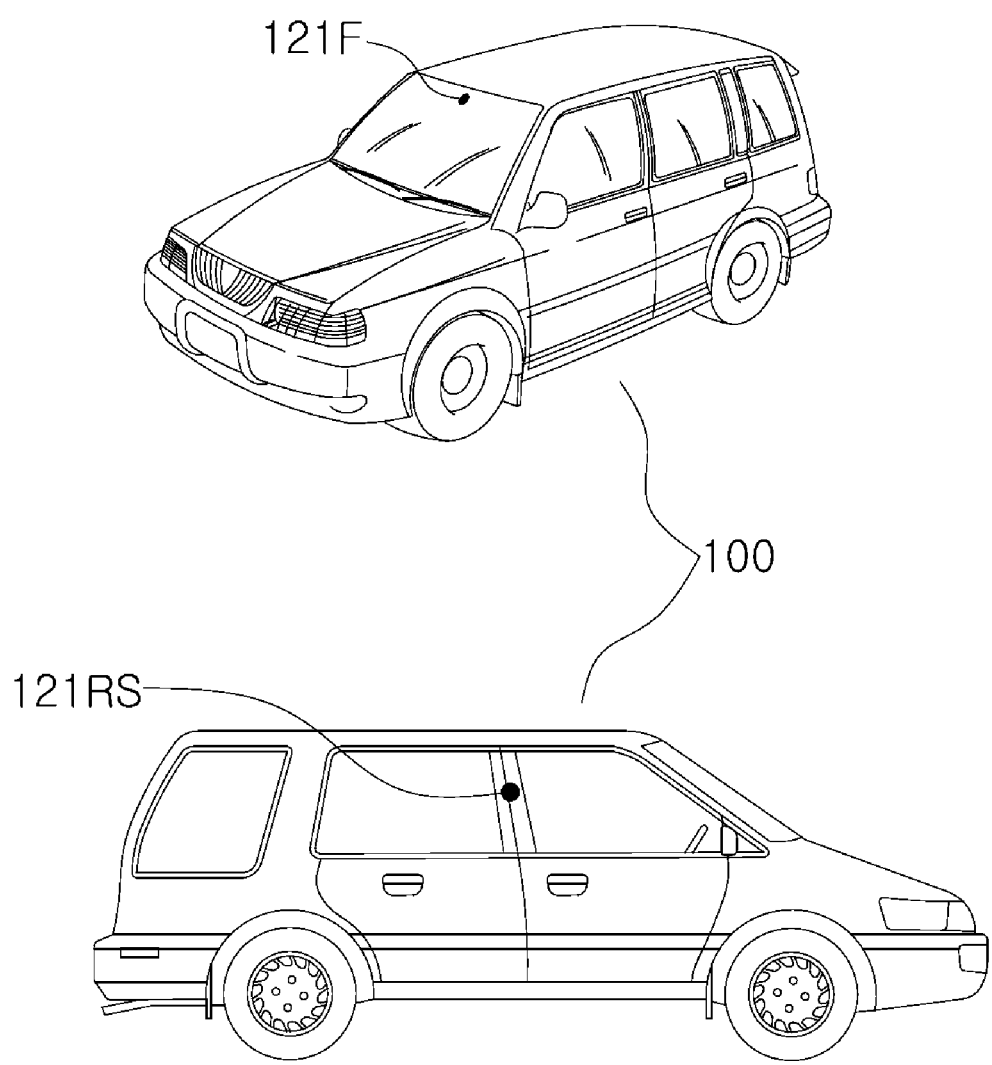
FIG. 3 shows a camera installed on an ego vehicle according to an exemplary embodiment of the present invention.

FIG. 2 shows a road environment awareness system of the ego vehicle 100 according to an exemplary embodiment. The road environment awareness system 120 includes a camera 121 and a processor 122. The camera 121 may be a monocular camera. The present invention is not limited thereto. In an exemplary embodiment, the camera 121 may include at least one stereoscopic camera. The camera 121 may be formed of an image sensor such as a complementary metal-oxide-semiconductor (CMOS) image sensor. The camera 121 may include a plurality of cameras installed on various locations of the ego vehicle 100. For example, as shown in FIG. 3, the camera 121 includes a front camera 121F and a right side camera 121RS. The front camera 121F is installed on a rear mirror and faces forward along a moving direction of the ego vehicle 100. The right side camera 121RS is installed on a roof post to face a right side of the ego vehicle 100. The camera 121 may further include a left side camera facing a left side of the ego vehicle 100 and a rear camera facing backward along the moving direction of the ego vehicle 100. The present invention is not limited thereto. In an exemplary embodiment, the position of the camera 121 and/or the number of the camera 121 may change depending on a shape or design of the ego vehicle 100. In an exemplary embodiment, the cameras 121 may take on various configurations such as long field of view (FOV), short FOV, wide angle, fisheye, etc.

Hereinafter, it is assumed that the front camera 121F captures the road environment, as shown in FIG. 2, surrounding the ego vehicle 100. The road environment includes the first to third neighboring vehicles 210 to 230 as described above with reference to FIGS. 1 and 2.

The processor 122 is coupled to the camera 121. The processor 122 operates to receive an input image IMG01 generated from the camera 121 (e.g., the front camera 121F). In an exemplary embodiment, the processor 122 may be coupled to the plurality of cameras. In an exemplary embodiment, the processor 122 may include a plurality of processors coupled to the plurality of cameras. Each of the plurality of processors may receive an input image from a corresponding camera of the plurality of cameras, and may calculate a trajectory of a neighboring vehicle captured by the corresponding camera. The processor 122 may be implemented in a single core or multi-cores to process a plurality of operations which will be described with reference to FIG. 4. In an exemplary embodiment, the processor 122 may include an application processor, an image processor or any other processing device that is configured to perform the plurality of operations of FIG. 4. For the simplicity of description, various components such as a memory system for storing image data obtained from the camera 121 and a communication system for communicating information relating to the road environment surrounding the ego vehicle 100 are omitted from the road environment awareness system 120.

Figure 4:
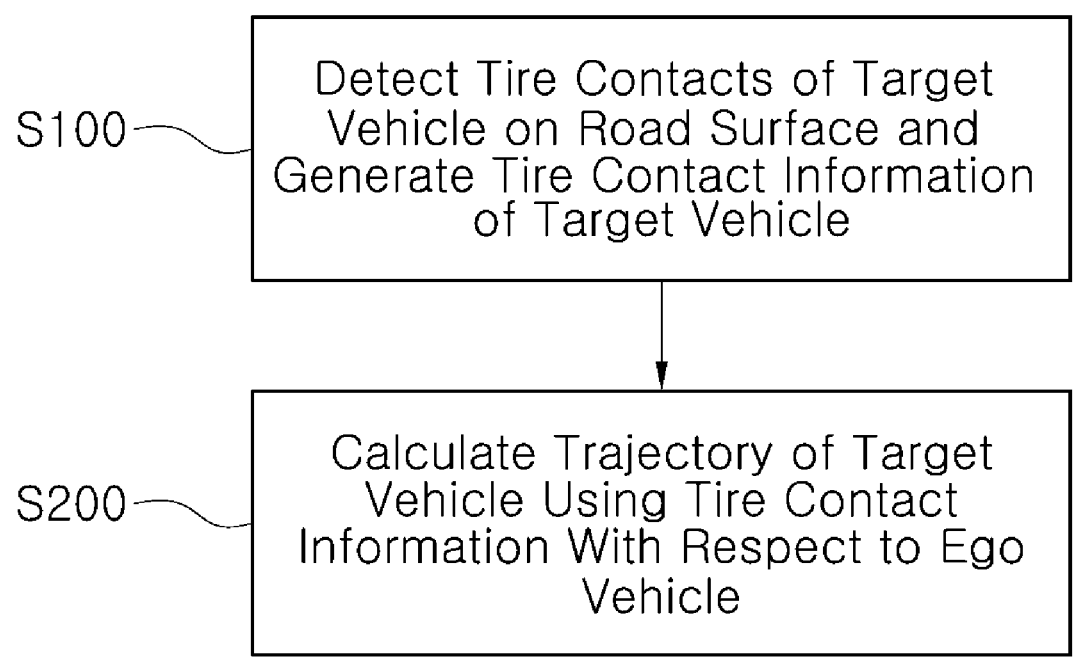
FIG. 4 shows a method of predicting a trajectory of a target vehicle using a road environment awareness system according to an exemplary embodiment of the present invention.

FIG. 4 shows a method of predicting a trajectory of a target vehicle using a road environment awareness system according to an exemplary embodiment. For the convenience of description, the first neighboring vehicle 210 is also referred to as a target vehicle. In step S100, the road environment awareness system 120 detects a plurality of tire contacts of a target vehicle on a road surface and generates a plurality of tire contact information of the target vehicle. In step S200, the road environment awareness system 120 calculates a first trajectory /T1 of the target vehicle using the plurality of tire contact information. The first trajectory /T1 includes an angular position including a relative distance rd1 of the target vehicle from the ego vehicle 100 and an angle θ1 with respect to the moving direction 110 of the ego vehicle 100, and a moving direction /u1 of the target vehicle.

Figure 5:
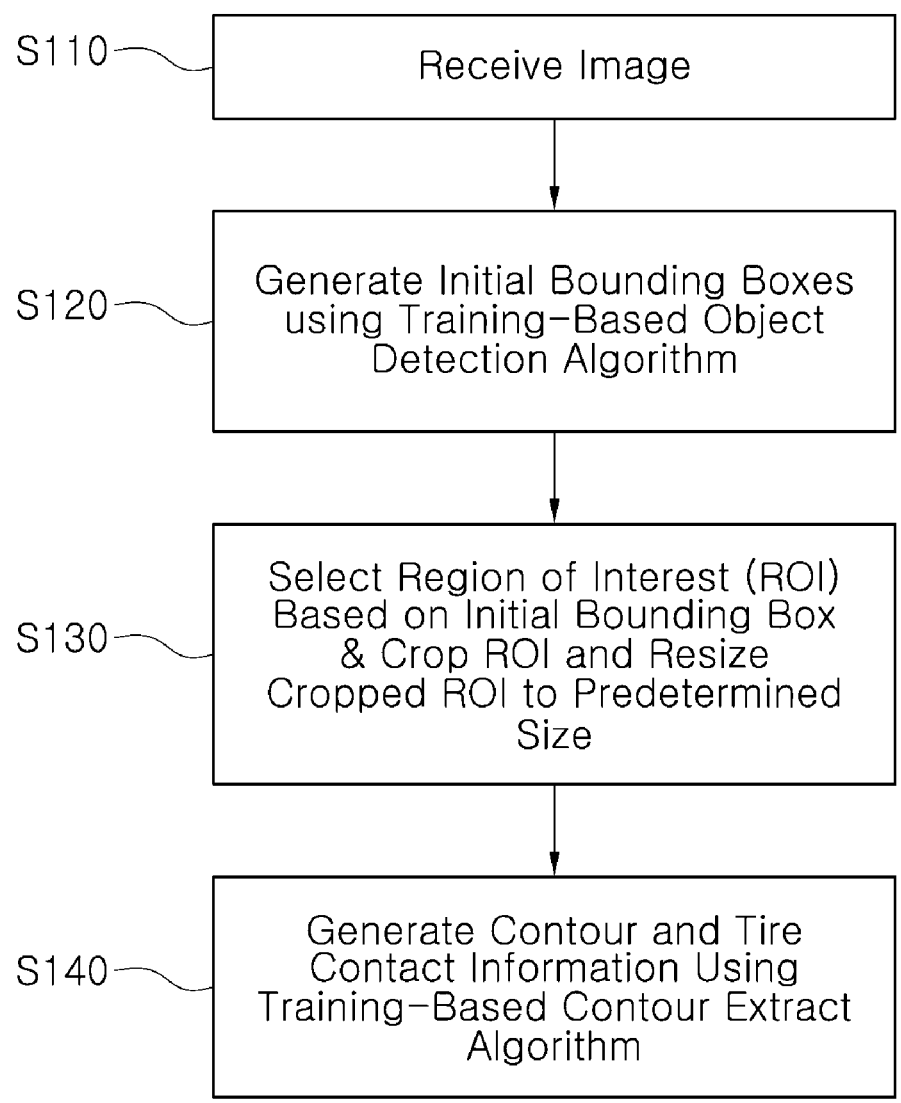
FIG. 5 shows a flowchart of implementing step S100 of FIG. 4 according to an exemplary embodiment of the present invention.
Figure 6:
FIG. 6 shows an image of a road environment surrounding an ego vehicle taken by a front camera thereof according to an exemplary embodiment of the present invention.
Figure 7:
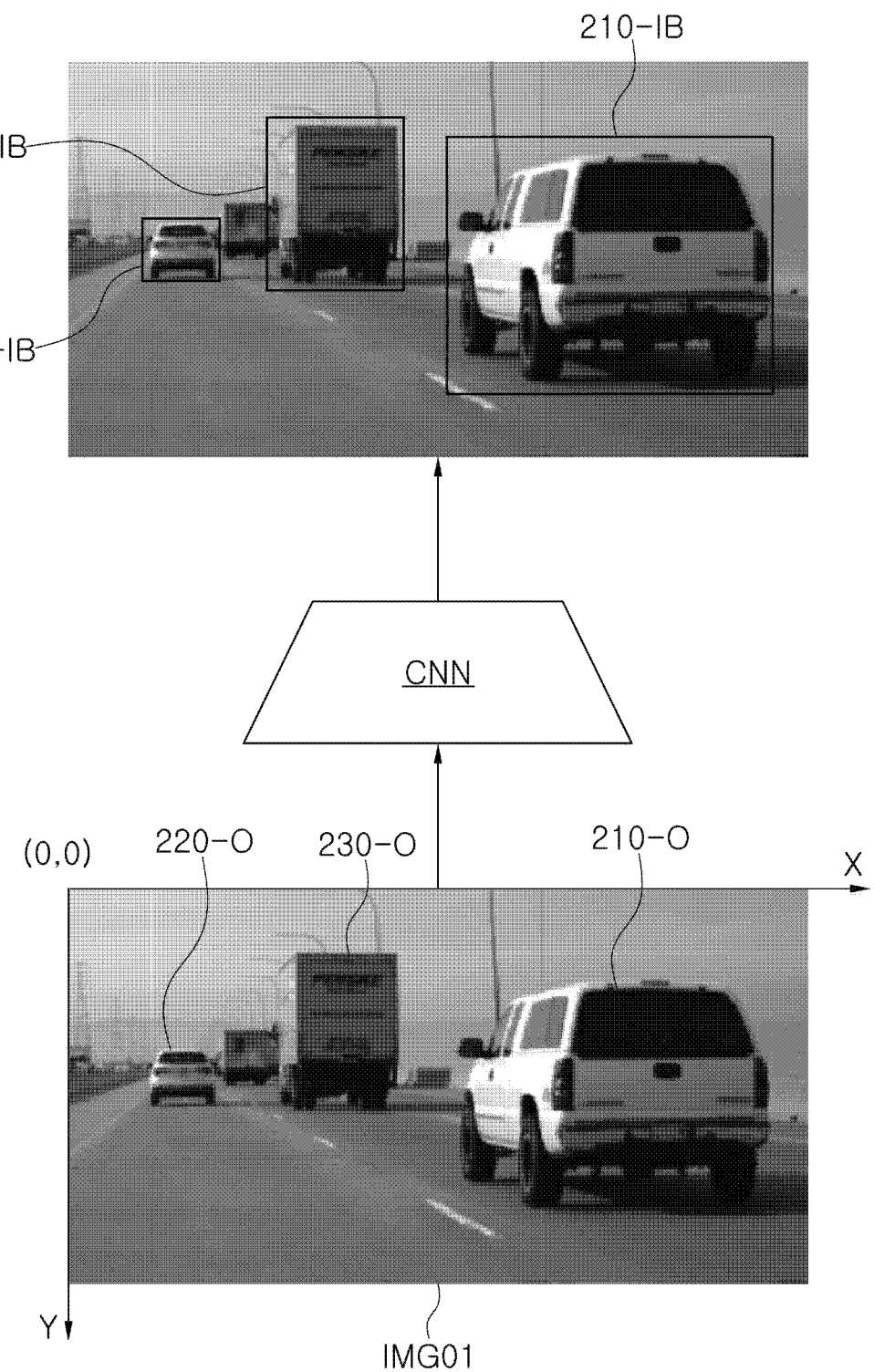
FIG. 7 shows a concept of generating an initial bounding box from an image according to an exemplary embodiment of the present invention.
Figure 8:
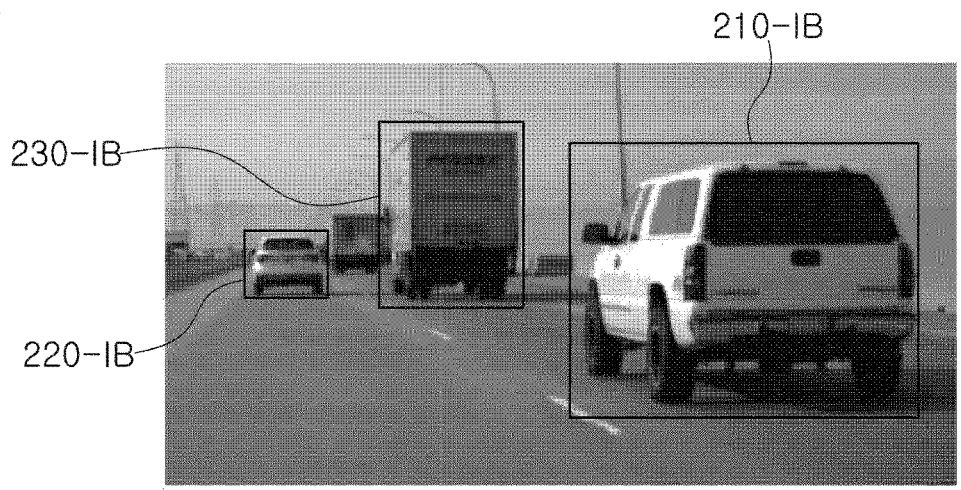
FIG. 8 shows a concept of cropping an initial bounding box and generating a resized image from the cropped image according to an exemplary embodiment of the present invention.
Figure 8:
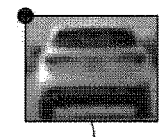
Figure 8:
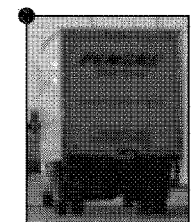
Figure 8:
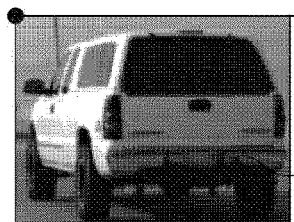
Figure 8:
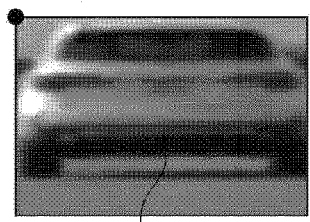
Figure 8:
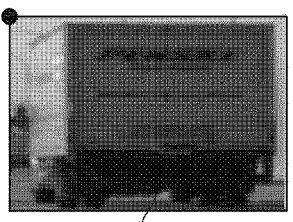
Figure 8:
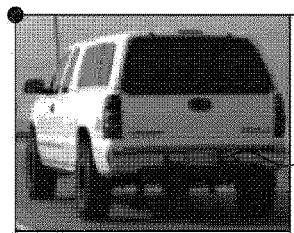

With reference to FIGS. 5 to 8, step S100 of FIG. 4 will be described in detail. FIG. 5 shows a flowchart of implementing step S100 of FIG. 4 according to an exemplary embodiment. FIG. 6 shows an image of a road environment surrounding an ego vehicle taken by a front camera thereof. FIG. 7 shows a concept of generating an initial bounding box from an image according to an exemplary embodiment. FIG. 8 shows a concept of cropping an initial bounding box and generating a resized image from the cropped image according to an exemplary embodiment.

With reference to step S110 of FIG. 5 and FIG. 6, the processor 122 operates to receive an input image IMG01 from the front camera 121F. In an exemplary embodiment, the input image IMG01 is a 512×288 pixel image. The present invention is not limited thereto. In an exemplary embodiment, the input image IMG01 may have various sizes. The location of each pixel in the input image IMG01 is represented with a Cartesian coordinate system, for example. In an exemplary embodiment, the coordinates of each pixel in the input image IMG01 are defined by the ordered pair (x,y), where x is a horizontal distance of the pixel from the origin of the input image IMG01 in the x-axis and y is a perpendicular distance of the pixel from the pixel to the origin of the input image IMG01 in the y-axis. The origin of the input image IMG01 corresponds to a predetermined pixel of the input image IMG01 (e.g., a pixel at the top left corner of the input image IMG01). In an exemplary embodiment, the input image IMG01 includes a plurality of vehicle objects 210-O to 230-O corresponding to the plurality of neighboring vehicles 210 to 230, as shown in FIG. 2, captured by the front camera 121F. The coordinate system is not limited thereto. In an exemplary embodiment, the coordinate system may be configured in various manners.

With reference to step S120 of FIG. 5 and FIG. 7, the processor 122 operates to generate a plurality of initial bounding boxes using a training-based object detection algorithm. In an exemplary embodiment, the training-based object detection algorithm may include a convolutional neural network (CNN) such as a region CNN (R-CNN) to detect the plurality of vehicle objects 210-O to 230-O from the input image IMG01.

In an exemplary embodiment, the R-CNN may be trained to detect various vehicle objects on a road. For example, the various vehicle objects on the road may represent four-wheel vehicles, two-wheel vehicles such as a bike and a motorcycle, or six or more wheel vehicles. The R-CNN may detect the plurality of vehicle objects 210-O to 230-O and may generate a plurality of initial bounding boxes 210-IB, 220-IB, and 230-IB. Each of the plurality of initial bounding boxes 210-IB to 230-IB may surround a corresponding vehicle object of the plurality of vehicle objects 210-O to 230-O. In an exemplary embodiment, the R-CNN may include an object proposal algorithm using anchor boxes, for example, that are fed to a classifier for detecting various vehicle objects.

The R-CNN receives the input image IMG01 and generates the plurality of initial bounding boxes 210-IB to 230-IB. Each of the plurality of initial bounding boxes 210-IB to 230-IB surrounds a corresponding vehicle object on the input image IMG01. In the road environment of FIGS. 1 and 2, for example, the R-CNN generates three initial bounding boxes 210-IB to 230-IB surrounding the three vehicle objects 210-O, 220-O, and 230-O, respectively. The R-CNN may also output coordinates of each of the three initial bounding boxes 210-IB to 230-IB in the input image IMG01. In an exemplary embodiment, coordinates of an initial bounding box (e.g., a first initial bounding box 210-IB) may correspond to coordinates of a pixel at the top left corner of the initial bounding box.

With reference to step S130 of FIG. 5 and FIG. 8, the processor 122 operates to select the plurality of initial bounding boxes 210-IB to 230-IB as a plurality of region of interests (ROIs), and crop the plurality of initial bounding boxes 210-IB to 230-IB to generate a plurality of cropped images 210-CI, 220-CI and 230-CI. Each of the plurality of cropped images 210-CI, 220-CI and 230-CI may have the coordinates of a corresponding initial bounding box, which is generated from the R-CNN, on the input image IMG01. For example, the first cropped image 210-CI corresponds to the first initial bounding box 210-IB and has coordinates of (m1, n1) of a pixel at the left top corner of the first initial bounding box 210-IB on the input image IMG01. The second cropped image 220-CI corresponds to the second initial bounding box 220-IB and has coordinates of (m2, n2) of a pixel at the left top corner of the second initial bounding box 220-IB on the input image IMG01. The third cropped image 230-CI corresponds to the third initial bounding box 230-IB and has coordinates of (m3, n3) of a pixel at the left top corner of the third initial bounding box 230-IB on the input image IMG01. The processor 122 operates to resize the plurality of cropped images 210-CI to 230-CI to generate a plurality of resized images 210-RI, 220-RI, and 230-RI. The plurality of resized images 210-RI to 230-RI may have the same size of a predetermined size (e.g., 96×96 pixels). In an exemplary embodiment, an aspect ratio of each of the plurality of cropped images 210-CI to 230-CI is not maintained in a process of resizing the plurality of cropped images 210-CI to 230-CI.

For the convenience of description, it is assumed that the first cropped image 210-CI is greater than the predetermined size (e.g., 96×96 pixels), and the second and third cropped images 220-CI and 230-CI are smaller than the predetermined size. In this case, the second and third cropped images 220-CI and 230-CI are increased to the predetermined size using an interpolation method such as Lanczos interpolation. For example, the Lanczos interpolation may be performed over 8×8 pixel neighborhood. The first cropped image 210-CI is reduced to the predetermined size using an image decimation method in which the pixels of the first cropped image 210-CI are resampled based on pixel area relations. The image decimation method may be performed without Moiré effect.

Figure 9:
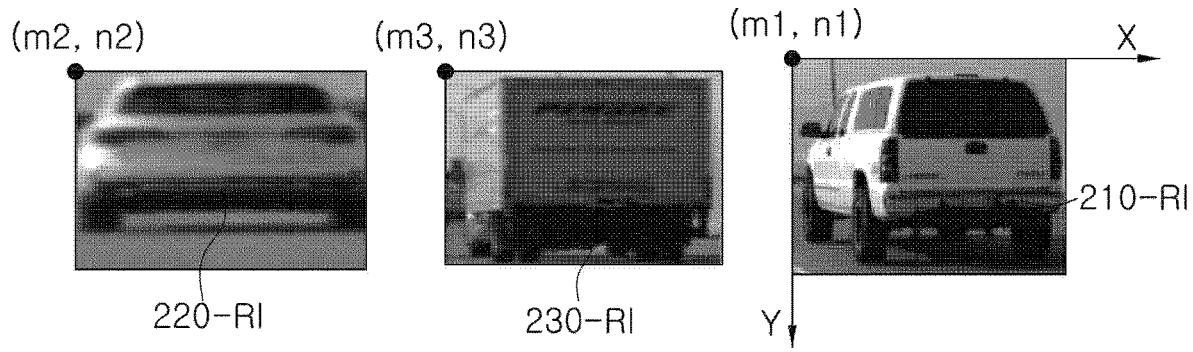
FIG. 9 shows a concept of generating a refined bounding box surrounding a contour of a vehicle object according to an exemplary embodiment of the present invention.
Figure 9:
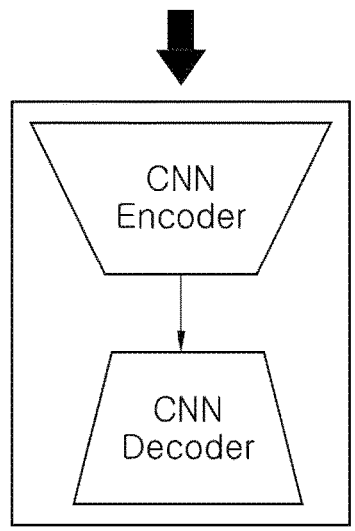
Figure 9:
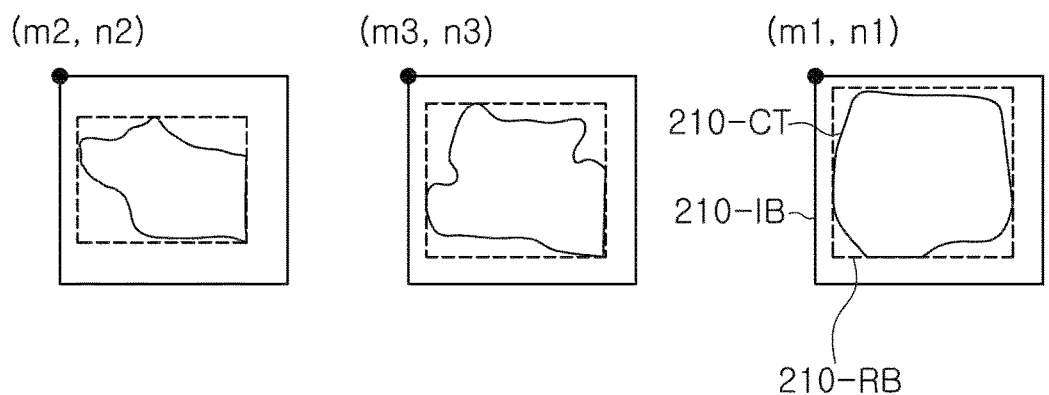
Figure 10A:
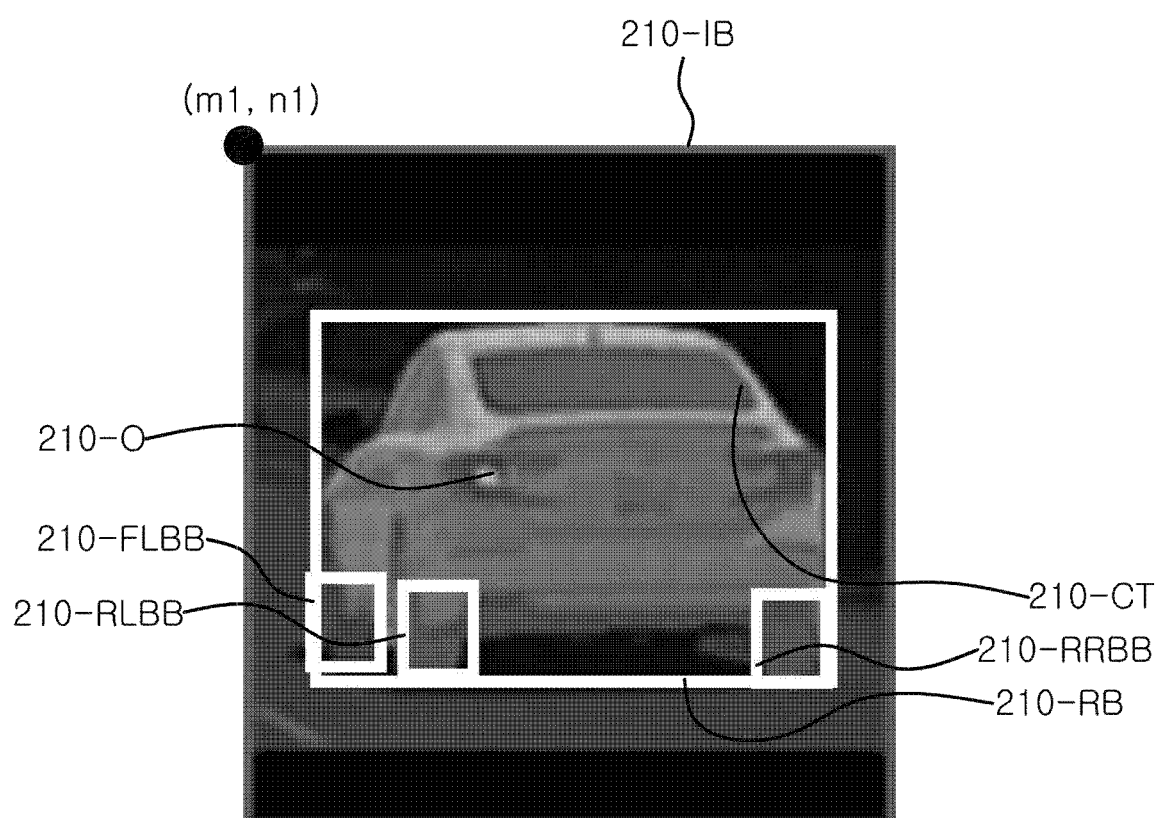
FIG. 10A shows a contour of a vehicle object detected from a resized image according to an exemplary embodiment of the present invention.

Hereinafter, with reference to FIGS. 9 and 10A, step S140 of FIG. 5 will be described in detail. FIG. 9 shows a concept of generating a refined bounding box surrounding a contour of a vehicle object according to an exemplary embodiment. FIG. 10A shows a contour of a vehicle object detected from a resized image according to an exemplary embodiment.

In step S140 of FIG. 5, the processor 122 operates to generate, from the plurality of resized images 210-RI to 230-RI, a plurality of contours 210-CT, 220-CT and 230-CT corresponding to the plurality of vehicle objects 210-O, 220-O and 230-O, respectively, using a training-based object contour detection algorithm such as a convolutional neural network. Using the training-based object contour detection algorithm, the processor 122 operates to generate a plurality of refined bounding boxes 210-RB, 220-RB and 230-RB surrounding the plurality of contours 210-CT, 220-CT and 230-CT, respectively.

In an exemplary embodiment, the training-based object contour detection algorithm may be implemented using a fully convolutional encoder-decoder network that performs pixel-wise class predictions. In an exemplary embodiment, the encoder network may include a convolutional neural network such as MobileNet architecture and EfficientNet-Edge TPU, and the decoder network may use 16 up-sampling and deconvolution units. The present invention is not limited thereto. In an exemplary embodiment, the configuration of the encoder network may change. Since the input patch to the CNN Encoder including the three resized images 210-RI to 230-RI is known to have a vehicle object, the CNN Encoder may be simplified or optimized to detect a contour of a vehicle object. In an exemplary embodiment, the CNN Encoder of the network may have a structure optimized for the size and resolution of each of the plurality of resized images 210-RI to 230-RI. The CNN Decoder network may up-sample and map the low-resolution CNN Encoder's features to generate the plurality of contours 210-CT to 230-CT.

With the training-based object contour detection algorithm, the processor 122 operates to generate tire contact information of each of the plurality of vehicle objects 210-O to 230-O from the plurality of resized images 210-RI to 230-RI. The training-based object contour detection algorithm is trained to detect at least one tire which is in contact with a road surface as shown in FIG. 10A.

In FIG. 10A, the training-based object contour detection algorithm detects a contour portion corresponding to at least one tire from the first vehicle object 210-O corresponding to the target vehicle, and generates at least one sub-bounding box surrounding the contour portion corresponding to the at least one tire. For example, the training-based object contour detection algorithm receives the first resized image 210-RI and generates the contour 210-CT corresponding to the first vehicle object 210-O in the first resized image 210-RI. Based on the contour 210-CT, the training-based contour extract algorithm generates a first refined bounding box 210-RB and first to third sub-bounding boxes 210-FLBB, 210-RLBB and 210-RRBB.

For example, the first sub-bounding box 210-FLBB surrounds a contour portion corresponding to a front-left tire of the first vehicle object 210-O (i.e., the first neighboring vehicle 210). The second sub-bounding box 210-RLBB surrounds a contour portion corresponding to a rear-left tire of the first vehicle object 210-O. The third sub-bounding box 210-RRBB surrounds a contour portion corresponding to a rear-right tire of the first vehicle object 210-O.

Using the first to third sub-bounding boxes 210-FLBB, 210-RLBB and 210-RRBB, the processor 122 operates to generate three tire contact information of the target vehicle. In an exemplary embodiment, the processor 122 operates to search a contact point between a bottom side of the first sub-bounding box 210-FLBB and the contour portion corresponding to the front-left tire of the first vehicle object 210-O, and to determine a contact point therebetween as corresponding to a tire contact between the front-left tire of the target vehicle and the road surface. In an exemplary embodiment, the bottom side of the first sub-bounding box 210-FLBB may contact at least two pixels on the contour portion corresponding to the front-left tire of the first vehicle object 210-O. In this case, the processor 122 may operate to select one of the at least two pixels (e.g., a pixel in a median location among the at least two pixels) as the contact point or select averaged coordinates (or a pixel nearest the averaged coordinates) of the at least two pixels as the contact point. The coordinates, in the first resized image 210-RI, of the contact point of the first sub-bounding box 210-FLBB may correspond to contact information of the front-left tire of the target vehicle. Since the first resized image 210-RI has the coordinates (m1, n1) of the initial bounding box 210-IB in the input image IMG01 and the size of the initial bounding box 210-IB, the coordinates of the contact point of first sub-bounding box 210-FLBB are calculated with reference to the Cartesian coordinate system of the input image IMG01, for example.

With respect to contact information of the rear-left tire of the first vehicle object 210-O and contact information of the rear-right tire of the first vehicle object 210-O, the description above may apply. In an exemplary embodiment, the processor 122 operates to search a contact point between a bottom side of the second sub-bounding box 210-RLBB and the contour portion corresponding to the rear-left tire of the first vehicle object 210-O, and to determine a contact point therebetween as corresponding to a tire contact between the rear-left tire of the target vehicle and the road surface. In an exemplary embodiment, the bottom side of the second sub-bounding box 210-RLBB may contact at least two pixels on the contour portion corresponding to the rear-left tire of the first vehicle object 210-O. In this case, the processor 122 may operate to select one of the at least two pixels (e.g., a pixel in a median location among the at least two pixels) as the contact point or may select averaged coordinates (or a pixel nearest the averaged coordinates) of the at least two pixels as the contact point. The coordinates, in the first resized image 210-RI, of the contact point of the second sub-bounding box 210-RLBB correspond to contact information of the rear-left tire of the target vehicle. Since the first resized image 210-RI has the coordinates (m1, n1) of the initial bounding box 210-IB in input image IMG01 and the size of the initial bounding box 210-IB, the coordinates of the contact point of second sub-bounding box 210-RLBB are calculated with reference to the Cartesian coordinate system of the input image IMG01, for example.

In an exemplary embodiment, the processor 122 operates to search a contact point between a bottom side of the third sub-bounding box 210-RRBB and the contour portion corresponding to the rear-right tire of the first vehicle object 210-O, and determine a contact point therebetween as corresponding to a tire contact between the rear-right tire of the target vehicle and the road surface. In an exemplary embodiment, the bottom side of the third sub-bounding box 210-RRBB may contact at least two pixels on the contour portion corresponding to the rear-right tire of the first vehicle object 210-O. In this case, the processor 122 may operate to select one of the at least two pixels (e.g., a pixel in a median location among the at least two pixels) as the contact point or may select averaged coordinates (or a pixel nearest the averaged coordinates) of the at least two pixels as the contact point. The coordinates, in the first resized image 210-RI, of the contact point of the third sub-bounding box 210-RRBB correspond to contact information of the rear-right tire of the target vehicle. Since the first resized image 210-RI has the coordinates (m1, n1) of the initial bounding box 210-IB in the input image IMG01 and the size of the initial bounding box 210-IB, the coordinates of the contact point of third sub-bounding box 210-RRBB are calculated with reference to the Cartesian coordinate system of the input image IMG01, for example.

Figure 10B:
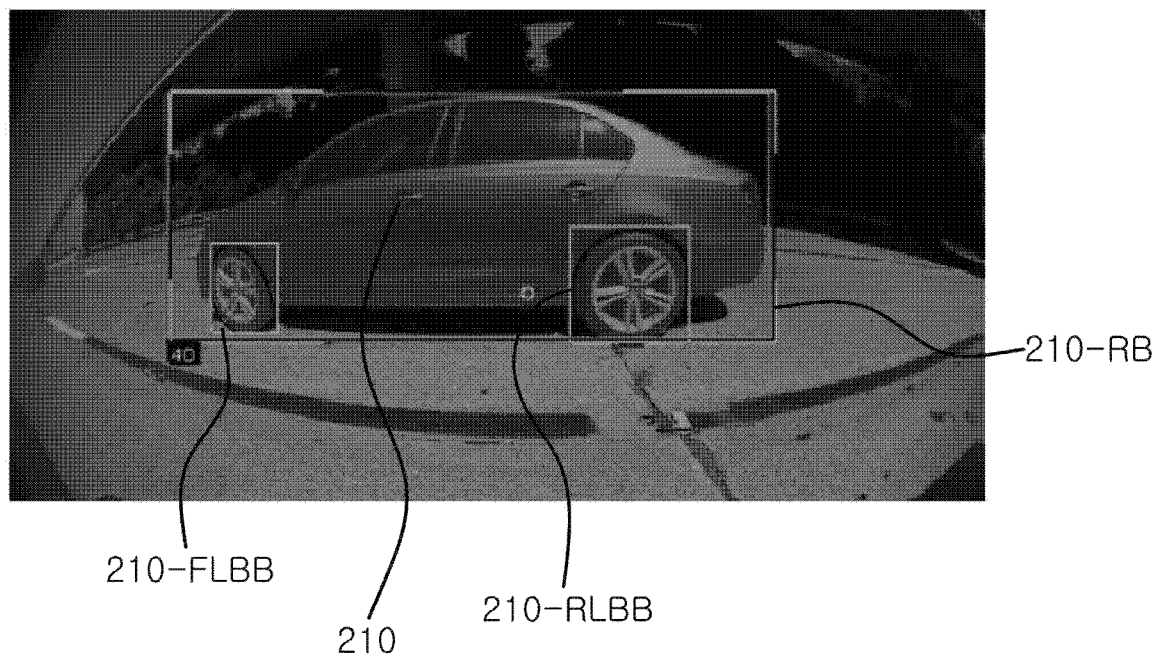
FIG. 10B shows sub-bounding boxes of side tires of a target vehicle traveling the right side of an ego vehicle according to an exemplary embodiment of the present invention.

FIG. 10B shows sub-bounding boxes of side tires of a target vehicle traveling the right side of the ego vehicle 100.

When the target vehicle is assumed to be traveling the right side of the ego vehicle 100, the road environment awareness system 120 detects two side tires of the target vehicle using the right side camera 121RS, and determines a first sub-bounding box 210-FLBB surrounding a contour portion corresponding to a front-left tire of the target vehicle and a second sub-bounding box 210-RLBB surrounding a contour portion corresponding to a rear-left tire of the target vehicle. With the first sub-bounding box 210-FLBB and the second sub-bounding box 210-RLBB, tire contact information of the front-left tire and tire contact information of the rear-left tire are calculated according to the method described above with reference to FIG. 10A. The input image IMG01 of FIG. 10B is taken using the right side camera 121RS with a fisheye lens, for example. In this case, the input image IMG01 of FIG. 10B may be converted to a Cartesian plane.

Figure 11A:
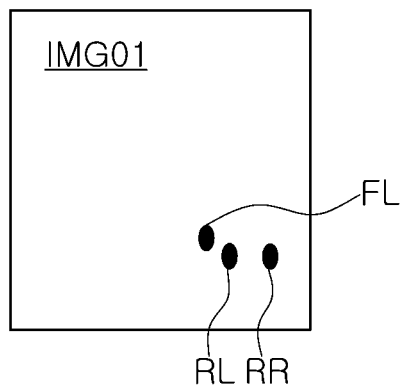
FIGS. 11A to 11C show first images having tire contact information of a target vehicle obtained after performing step S100 of FIG. 4 according to an exemplary embodiment of the present invention.
Figure 11B:
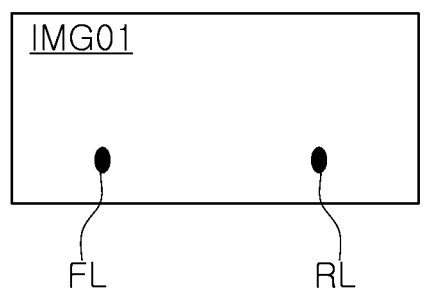
Figure 11C:
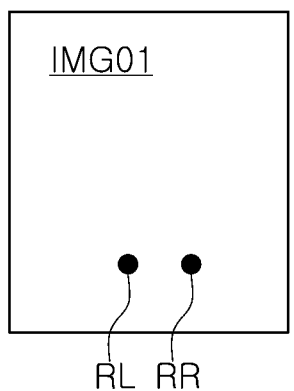

FIGS. 11A to 11C show the first image IMG01 having tire contact information of a target vehicle obtained after performing step S100 of FIG. 4. FIG. 11A shows a first image IMG01 having tire contact information of a target vehicle having three tires (e.g., two rear tires and one front-left tire) detected by the ego vehicle 100. FIG. 11B shows a first image IMG01 having tire contact information of a target vehicle having two rear tires detected by the ego vehicle 100. FIG. 11C shows a first image IMG01 having tire contact information of a target vehicle having two side tires (e.g., a front-left tire and a rear-left tire) detected by the ego vehicle 100. The present invention is not limited thereto. In an exemplary embodiment, the ego vehicle 100 may detect at least two tires including two front tires from a vehicle approaching the ego vehicle 100 in the opposite direction. In this case, the method of calculating tire contact information from an input image as discussed above applies to the input image including at least two tires including two front tires of the vehicle approaching the ego vehicle 100 in the opposite direction.

Figure 12:
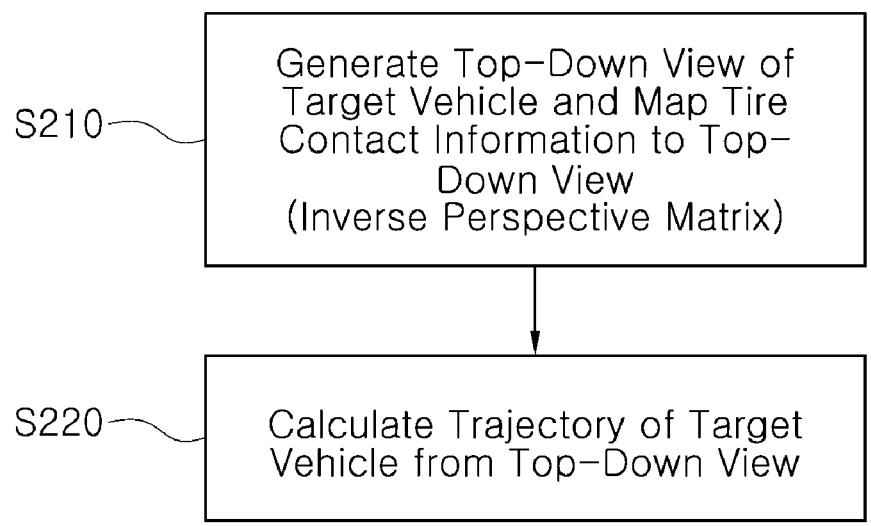
FIG. 12 shows a flowchart of implementing step S200 of FIG. 4 according to an exemplary embodiment of the present invention.
Figure 13A:
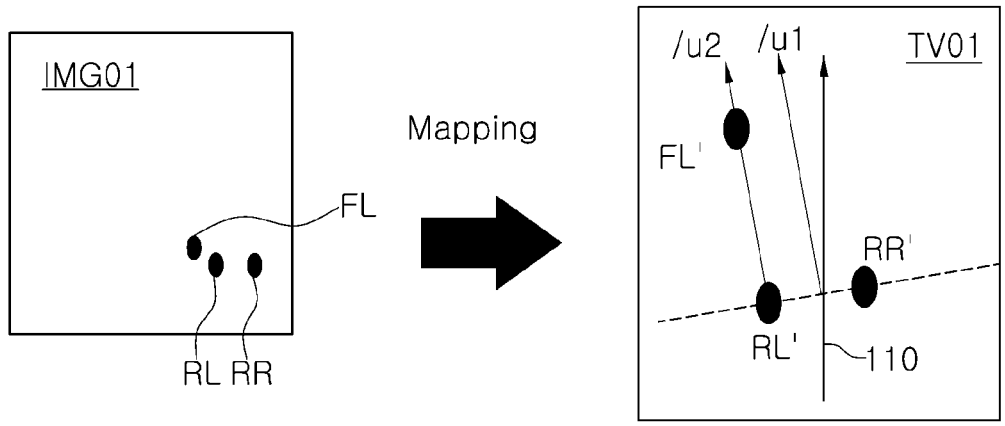
FIGS. 13A to 13C show a mapping operation of tire contact information of a target vehicle from an input image to a top down view image according to an exemplary embodiment of the present invention.
Figure 13B:
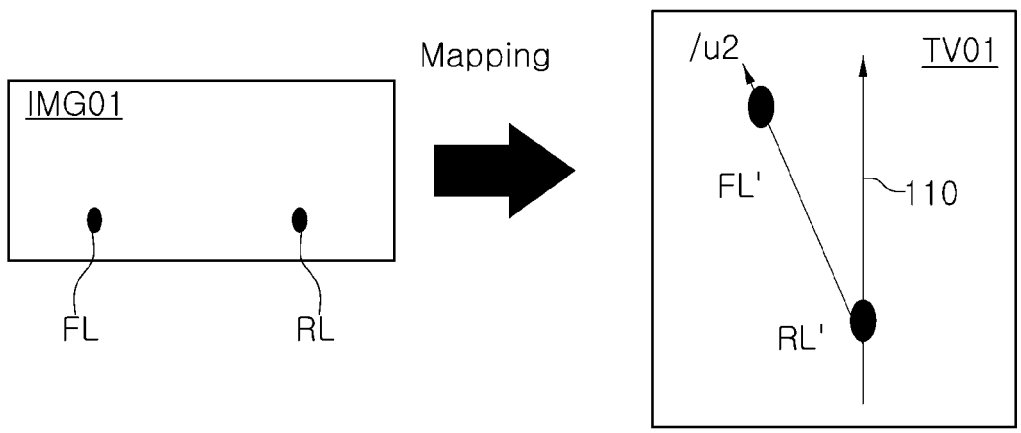
Figure 13C:
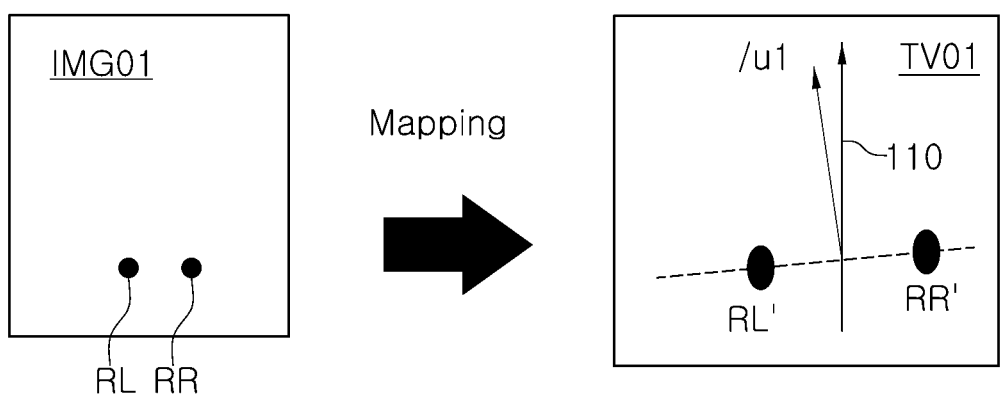
Figure 14:
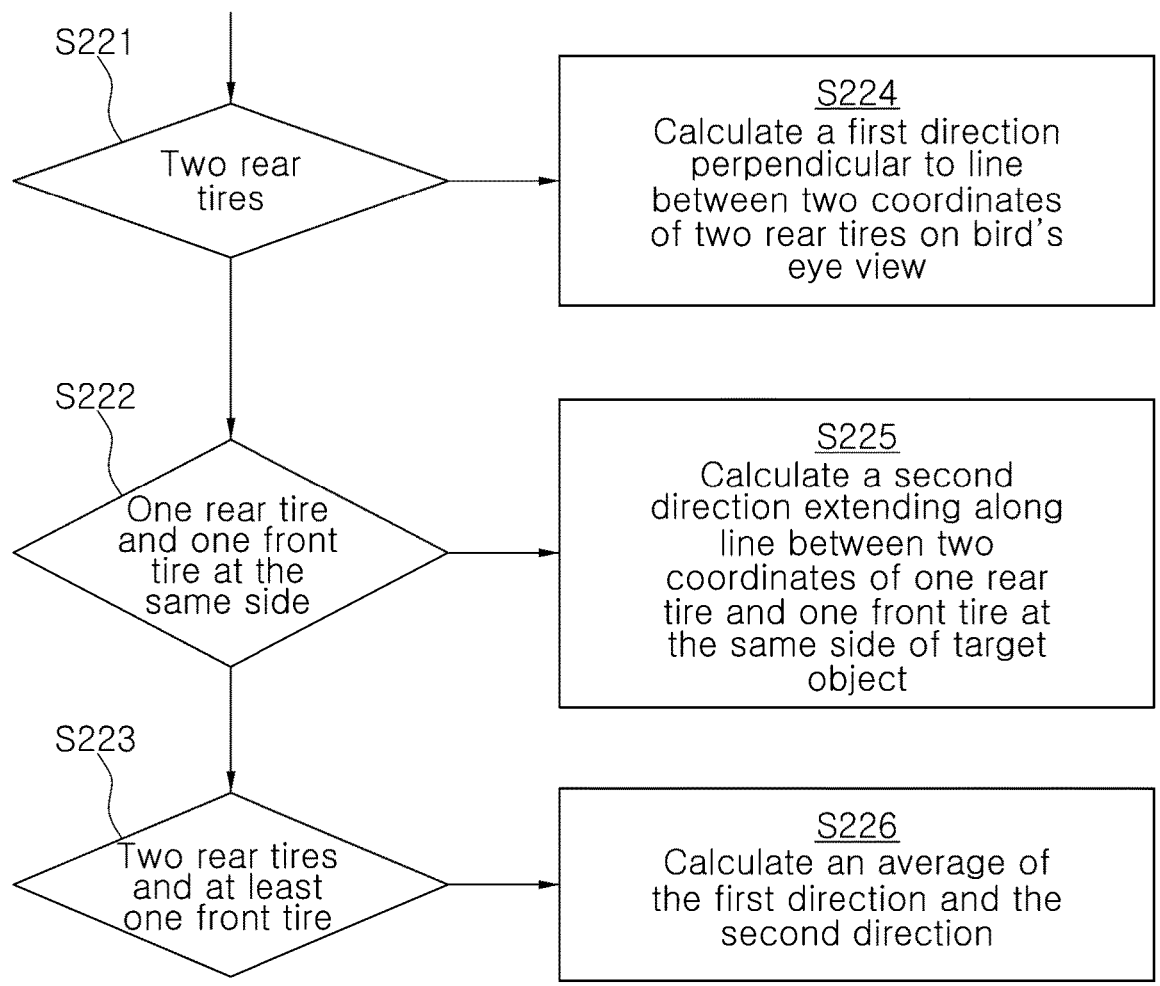
FIG. 14 shows a flowchart of calculating a moving direction of a target vehicle according to an exemplary embodiment of the present invention.

With reference to FIGS. 12, 13A to 13C and 14, step S200 of FIG. 4 will be described in detail. FIG. 12 shows a flowchart of implementing step S200 of FIG. 4 according to an exemplary embodiment. FIGS. 13A to 13C show a mapping operation of tire contact information of a target vehicle from an input image to a top down view image. FIG. 14 shows a flowchart of calculating a moving direction of a target vehicle. In an exemplary embodiment, the top down view image may correspond to a bird's eye view image.

FIG. 12 shows a flowchart of implementing step S200 of FIG. 4 according to an exemplary embodiment. The processor 122 operates to map tire contact information from the input image IMG01 to a top-down view plane to calculate a trajectory of a target vehicle. For the convenience of description, the first neighboring vehicle 210 is the target vehicle.

With reference to step S210 of FIG. 12 and FIG. 13A, the processor 122 operates to generate a top-down view image TV01 of the input image IMG01, mapping the contact information of the target vehicle from the input image IMG01 onto the top-down view image TV01 using an inverse perspective matrix. The inverse perspective matrix corresponds to a projective transformation configured to generate the bird's eye view image. In an exemplary embodiment, the inverse perspective matrix may be used to calculate mapping between each point (e.g., a pixel) in the input image IMG1 taken the camera 121 and a corresponding point of the top down view image TV01.

FIG. 13A shows an operation of mapping tire contact information of a target vehicle from the first input image IMG01 to a top down view image TV01 such as a bird's eye view image generated by the inverse perspective matrix. The first image IMG01 has tire contact information of a target vehicle having three tires (e.g., two rear tires and one front-left tire) detected by the ego vehicle 100, and the tire contact information of the three tires on the input image IMG01 is mapped onto the top down view image TV01.

FIG. 13B shows an operation of mapping tire contact information of a target vehicle of the first input image IMG01 to a top down view image TV01 such as a bird's eye view generated by the inverse perspective matrix. The first image IMG01 has tire contact information of a target vehicle having two side tires (e.g., a front-left tire and a rear-left tire), and the tire contact information of the two side tires is mapped onto the top down view image TV01. The present invention is not limited thereto. In an exemplary embodiment, the input image IMG01 may include at least two tire contact information of a target vehicle having two front tires detected by the ego vehicle 100. In this case, the target vehicle may approach the ego vehicle 100 in the opposite direction.

FIG. 13C shows an operation of mapping tire contact information of a target vehicle of the first input image IMG01 to a top down view image TV01 such as a bird's eye view image generated by the inverse perspective matrix. The first image IMG01 has tire contact information of a target vehicle having two rear tires, and the tire contact information of the two rear tires on the input image IMG01 is mapped onto the top down view image TV01.

With reference to step S220 of FIG. 12, FIG. 13A and FIG. 14, the processor 122 operates to determine whether the input image IMG01 has tire contact information of two rear tires of a target vehicle (S221), and to calculate, in response to determining that the target vehicle has the tire contact information (e.g., tire contacts RL and RR on the input image 01) of the two rear tires, a first moving direction /u1 from the two corresponding points RL' and RR' on the top down view image (S224). The first moving direction /u1 may correspond to a direction perpendicular to a line connecting the two corresponding points RL' and RR'. In an exemplary embodiment, the first moving direction /u1 is calculated with reference to the moving direction 110 of the ego vehicle 100. In an exemplary embodiment, the relative distance rd1 and the angle θr1 are calculated using a center point of the two corresponding points RL' and RR', for example. The present invention is not limited thereto. In an exemplary embodiment, the relative distance rd1 and the angle θr1 may be calculated using one of the two corresponding points RL' and RR'. In an exemplary embodiment, the relative distance rd1 and the angle θr1 may be calculated using a center point of a refined bounding box surrounding a corresponding contour.

In an exemplary embodiment, the processor 122 operates to set the first moving direction /u1 as a moving direction of the target vehicle. However, the present invention is not limited thereto. In an exemplary embodiment, the processor 122 operates to proceed to step S222 to determine whether the input image IMG01 has tire contact information (e.g., tire contacts RL and FL) of two side tires (e.g., one rear tie and one front tire at the same side of the target vehicle), of the target vehicle (S222), and to calculate, in response to determining that the target vehicle has the tire contact information of the two side tires, a second moving direction /u2 from the two corresponding points RL' and FL' on the top down view image (S225). The second moving direction /u2 is parallel to a line connecting the two points RL' and FL'. In an exemplary embodiment, the processor 122 operates to set the second moving direction /u2 as a moving direction of the target vehicle. The present invention is not limited thereto. In an exemplary embodiment, the processor 122 further operates to proceed to step S223, after obtaining the first moving direction /u1 and the second moving direction /u2, to calculate an average of the first moving direction /u1 and the second moving direction /u2. In this case, the processor 122 operates to set the averaged moving direction as a moving direction of the target vehicle.

With reference to FIG. 13B and FIG. 14, the processor 122 operates to determine whether the input image IMG01 has tire contact information of two rear tires of a target vehicle (S221). In response to the determining the input image IMG01 as not having the tire contact information of the two rear tires, the processor 122 operates to proceed to step S222 to determine whether the input image IMG01 has tire contact information of two side tires of the target vehicle (S222). In response to determining the input image IMG01 as having the tire contact information of the two side tires, the processor 122 operates to calculate the second moving direction /u2 of the target vehicle (S225). The first moving direction /u1 of the target vehicle is parallel to a line connecting two points RL' and FL'. In this case, without further proceeding to step S223, the processor 122 operates to set the second moving direction /u2 as a moving direction of the target vehicle.

With reference to FIG. 13C and FIG. 14, the processor 122 operates to determine whether the input image IMG01 has tire contact information of two rear tires of a target vehicle (S221). In response to determining the input image IMG01 as having the tire contact information of the two rear tires, the processor 122 operates to calculate the first moving direction /u1 of the target vehicle (S224). The first moving direction /u1 of the target vehicle is perpendicular to a line connecting two points RL' and RR'. In an exemplary embodiment, the processor 122 operates to set the first moving direction /u1 as a moving direction of the target vehicle without further proceeding to step S222. The present inventive concept is not limited thereto. In an exemplary embodiment, the processor further operates to proceed to step S222 to determine whether the input image IMG01 has tire contact information of two side tires. In this case where the input image IMG01 has no tire contact information of the two side tires, the processor 122 operates to set the first moving direction /u1 as the moving direction of the target vehicle without further proceeding to step S223.

According to an exemplary embodiment, the ego vehicle 100 predicts a trajectory of a target vehicle using tire contact information thereof, and based on the trajectory, controls the steering, acceleration and/or deceleration of the ego vehicle to safely follow a route or to avoid collision to the target vehicle.

While the present inventive concept has been shown and described with reference to exemplary embodiments thereof, it will be apparent to those of ordinary skill in the art that various changes in form and detail may be made therein without departing from the spirit and scope of the inventive concept as defined by the following claims.

What is claimed is:

1. A method of predicting a trajectory of a target vehicle with respect to an ego vehicle, the method comprising:
   receiving a first image having a target object representing the target vehicle on a road from a camera mounted on the ego vehicle;
   generating a bounding box associated with the target vehicle, wherein the bounding box surrounds a contour of the target object;
   extracting a plurality of tire contact information of the target object with a road surface from the first image, wherein each of the plurality of tire contact information represents coordinates, in the first image, of contact between a corresponding tire and the road;

mapping the plurality of tire contact information from the first image to a bird's eye view image of the first image; and calculating the trajectory, with reference to a moving direction of the ego vehicle, of the target object using the plurality of mapped tire contact information on the bird's eye view image.

2. The method of claim 1,
wherein the trajectory of the target object includes a moving direction of the target vehicle with reference to the moving direction of the ego vehicle and a location of the target vehicle with reference to the ego vehicle.

3. The method of claim 1,
wherein the generating of the bounding box includes detecting the target object from the first image;
generating a preliminary bounding box associated with the target object;
cropping an input image using the preliminary bounding box;
resizing the input image to a predefined size;
detecting the contour of the target object from the resized input image; and
generating the bounding box based on the contour.

4. The method of claim 3,
wherein the extracting of the tire contact information includes:
detecting at least two contour portions corresponding to at least two tires of the target object from the resized input image; and
determining a tire type of each of the at least two contour portions and coordinates thereof within the first image.

5. The method of claim 4, further comprising:
generating at least two sub-bounding boxes surrounding the at least two contour portions,
wherein the plurality of tire contact information include coordinates of where a bottom side of each of the at least two sub-bounding boxes contacts a corresponding one of the at least two contour portions.

6. The method of claim 4,
wherein the at least two contour portions represents two rear tires of the target object or at least one rear tire and at least one front tire of the target object.

7. The method of claim 6,
wherein the calculating of the trajectory includes:
calculating, in response to the at least two contour portions corresponding to two rear tires of the target object, a first direction perpendicular to a line between coordinates of the two rear tires as a first moving direction of the target vehicle with reference to the moving direction of the ego vehicle; and
calculating, in response to the at least two contour portions corresponding to a first rear tire and a first front tire positioned at the same side of the target object, a second direction extending along a line between coordinates of the first rear tire and the first front tire as a second moving direction of the target vehicle with reference to the moving direction of the ego vehicle.

8. The method of claim 7,
wherein the calculating of the trajectory further includes:
calculating, in response to the at least two contour portions corresponding to the two rear tires and the first front tire of the target object, an average of the first moving direction and the second moving direction as a moving direction of the target vehicle with reference to the moving direction of the ego vehicle.

9. The method of claim 4,
wherein the extracting of the tire contact information further includes:
inputting the resized input image into a convolutional neural network,
wherein the convolutional neural network performs the detecting of the at least two contour portions corresponding to at least two tires of the target object and the determining of the tire type of each of the at least two contour portions and the coordinates thereof within the first image.

10. The method of claim 4,
wherein the calculating of the trajectory includes:
calculating a distance between the ego vehicle and the target object using at least one of the plurality of mapped tire contact information.

11. A method of predicting a trajectory of a target vehicle with respect to an ego vehicle, the method comprising:
receiving a first image having a plurality of target objects representing a plurality of target vehicles on a road from a camera mounted on the ego vehicle;
detecting the plurality of target objects from the first image using a first convolutional neural network;
generating a plurality of preliminary bounding boxes associated with the plurality of target objects;
cropping the plurality of preliminary bounding boxes to generate a plurality of input images;
resizing each of the plurality of input images to a predefined size;
detecting a plurality of contours of the plurality of target objects from the plurality of resized input images;
extracting a plurality of tire contact information of a first target object of the plurality of target objects from a corresponding resized input image of the plurality of resized input images, wherein each of the plurality of tire contact information represents coordinates, in the first image, of contact between a corresponding tire of the first target object and the road;
generating a plurality of bounding boxes based on the plurality of contours of the plurality of target objects;
mapping the plurality of tire contact information of the first target object from the first image to a bird's eye view image; and
calculating a trajectory of the first target object, with reference to a moving direction of the ego vehicle, using the plurality of mapped tire contact information on the bird's eye view image.

12. The method of claim 11,
wherein the extracting of the plurality of tire contact information includes:
detecting at least two contour portions corresponding to at least two tires of the first target object from a resized input image, associated with the first target object, of the plurality of resized input images; and
determining a tire type of each of the at least two contour portions and coordinates thereof within the first image.

13. The method of claim 12,
wherein the at least two contour portions represent two rear tires of the first target object or at least one rear tire and at least one front tire of the first target object.

14. The method of claim 13,
wherein the extracting of the plurality of tire contact information further includes:
inputting the plurality of resized input images into a second convolutional neural network to extract the plurality of tire contact information from each of the plurality of resized input images, and wherein the second convolutional neural network is configured to perform the detecting of at least two contour portions from the resized input image associated with the first target object and the determining of the tire type of each of the at least two contour portions and the coordinates thereof within the first image.

15. The method of claim 11,
wherein the trajectory of the first target object includes a moving direction of the first target object with reference to the moving direction of the ego vehicle and a location of the first target object with reference to the ego vehicle.

16. A method of controlling an ego vehicle, the method comprising:
receiving a first image having a plurality of target objects representing a plurality of target vehicles on a road from a camera mounted on the ego vehicle;
generating a plurality of preliminary bounding boxes surrounding the plurality of target objects using a first convolutional neural network;
generating, from the first image, a plurality of input images by resizing a plurality of image portions defined by the plurality of preliminary bounding boxes,
wherein the plurality of input images have a same size;
generating, from each of the plurality of input images, a contour of a corresponding target object and at least two tire contact information associated with at least two tires of the corresponding target object using a second convolutional neural network,
wherein the at least two tire contact information is associated with at least two contour portions of the contour of the corresponding target object, and wherein each of the at least two tire contact information represents coordinates, in the first image, of contact between a corresponding tire and the road;
mapping the at least two tire contact information from the first image to a bird's eye view image of the first image; and
calculating a moving direction, with reference to a first moving direction of the ego vehicle, of the corresponding target object using the mapped at least two tire contact information on the bird's eye view image; and
adjusting, in response to the calculating of the moving direction of the corresponding target object, the first moving direction of the ego vehicle to a second moving direction thereof.

17. The method of claim 16,
wherein the mapping is performed using an inverse perspective matrix, and
wherein the bird's eye view image is generated using the inverse perspective matrix from the first image.

18. The method of claim 16,
wherein the camera is a monocular camera.

19. The method of claim 16,
wherein the generating, from each of the plurality of input images, the contour of the corresponding target object includes:
generating a bounding box surrounding the contour of the corresponding target object and at least two sub-bounding boxes surrounding the at least two contour portions of the contour of the corresponding target object.

20. The method of claim 19,
wherein the at least two tire contact information include coordinates of where a bottom side of each of the at least two sub-bounding boxes contacts a corresponding one of the at least two contour portions.

* * * * *